Feb. 16, 1971  F. WATTIMENA  3,563,914
SILVER CATALYST
Filed Nov. 28, 1967

INVENTOR:
FREDDY WATTIMENA
BY: [signature]
HIS ATTORNEY

3,563,914
SILVER CATALYST
Freddy Wattimena, Amsterdam, Netherlands, assignor to Shell Oil Company, New York, N.Y., a corporation of Delaware
Filed Nov. 28, 1967, Ser. No. 686,034
Claims priority, application Great Britain, Mar. 22, 1967, 13,486/67
Int. Cl. B01j *11/06*
U.S. Cl. 252—463　　　　　　　　　　　　　　3 Claims

ABSTRACT OF THE DISCLOSURE

An improved silver catalyst obtained by impregnating a support with a solution of a reducible silver compound and rapidly removing absorbed liquid at an elevated temperature in the presence of a reducing agent.

---

Figure 1:
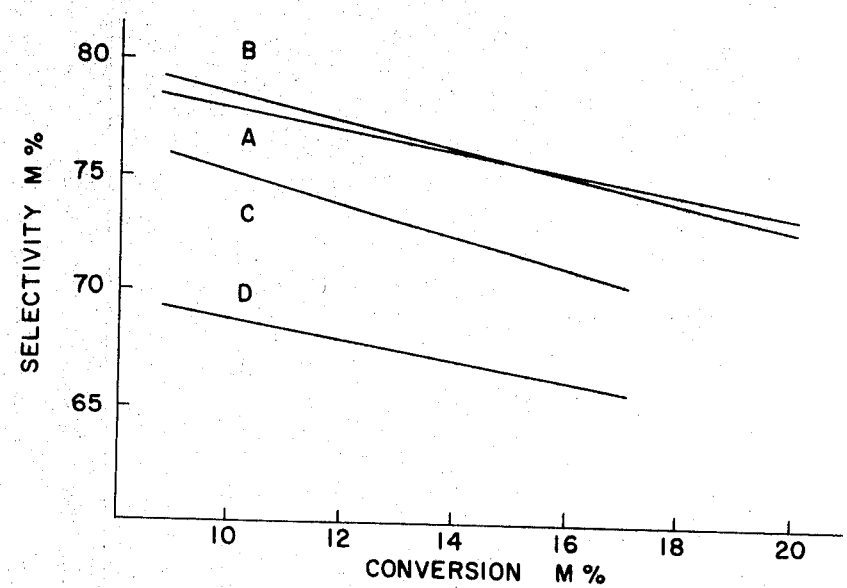
Figure 2:
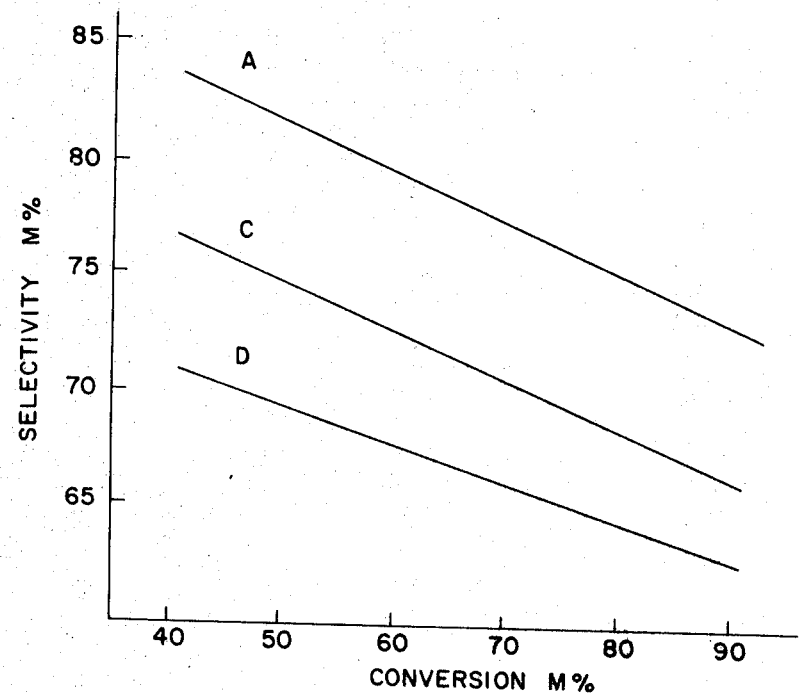

This invention relates to an improved supported silver catalyst, the method of its production and its use in the oxidation of olefins to olefin oxides.

Catalysts consisting essentially of silver, in the form of the metal or an oxide, upon a suitable support are known to be useful in catalyzing certain chemical oxidation reactions. They find application in the production of ethylene oxide by the controlled incomplete oxidation of ethylene. The importance of its role in such processes has led to intensive search for silver catalysts enabling their use with improved efficiency. This has resulted in inventive contributions based upon methods of manufacture as well as the incorporation of agents intended to modify their characteristics. These have, however, not always obviated the relatively low production rates and process limitations unavoidably associated with the use of the catalysts produced by methods disclosed heretofore.

It is therefore an object of the present invention to provide an improved process enabling the more efficient production of an improved supported silver catalyst.

A further object of the invention is the provision of a method enabling the production of a supported silver catalyst particularly suitable for the controlled oxidation of olefinic hydrocarbons to olefin oxides.

A still further object of the invention is the provision of an improved process enabling the more efficient, silver-catalyzed, controlled, incomplete oxidation of ethylene to ethylene oxide.

A particular object of the invention is the provision of an improved process enabling the more efficient, vapor-phase, controlled, incomplete oxidation of propylene to propylene oxide with the aid of an improved supported silver catalyst.

Other objects and advantages of the claimed invention will become apparent from the following detailed description thereof made with reference to the attached drawing wherein FIGS. I and II are graphs wherein conversions are plotted against selectivities in operations directed to the silver-catalyzed oxidation of ethylene to ethylene oxide.

In accordance with the process of the invention an improved silver catalyst, particularly suitable for the incomplete oxidation, in vapor phase, of olefins to olefin oxides, is obtained by impregnating a catalyst support with a solution of a reducible silver salt and thereafter rapidly removing absorbed liquid from said impregnated support in the presence of a reducing agent.

In a preferred embodiment of the invention, an improved supported silver catalyst is prepared by the consecutive steps of impregnating a porous catalyst support with a solution of a reducible silver compound in a solvent or carrying medium comprising a reducing agent and subjecting said impregnated support, comprising said reducing agent-containing solution, to rapid drying at elevated temperature conditions effecting the removal therefrom of at least 80% by volume of absorbed liquid in a time period not exceeding about 900 seconds. The very rapid absorbed liquid removal step of the process of the invention is termed "Shock-Drying."

By the term "reducible silver compounds" as used in the present specification and attached claims, is meant those compounds from which metallic silver is obtained by chemical reduction or by combined thermal decomposition and chemical reduction. Such compounds include, for example, silver salts of mineral acids as silver nitrate, silver carbonate, silver complexes including ammoniacal silver complexes, silver salts of carboxylic acids such as formic, acetic, propionic, pivalic, malic, lactic, tartaric, salicylic and maleic acid etc. Preferred of these compounds are those which are readily soluble, for example, in concentrations of at least 10 grams per liter, preferably at least 50 grams per liter, in liquid media used as solvents in the catalyst preparation in accordance with the invention. Particularly preferred is silver nitrate. The concentrations of the silver compounds in the impregnating solutions should in general be adjusted to provide a silver content in the final catalysts of between about 3 and about 25% w., preferably between about 5 and about 15% w., calculated as weight of silver metal on the weight of the support.

Essential to the attainment of the objects of the present invention is the rapid evaporation of absorbed liquid from the impregnated support after the impregnation. In its broadest aspects the term "Shock-Drying" or "rapid evaporation" as used herein and in the attached claims is meant any treatment in which at least 80% v. of the liquid absorbed by the support is removed therefrom by evaporation in a period of at most about 900 seconds. By "absorbed" liquid it is intended to means broadly liquid retained on the surface and in the pores of the support whether by absorption, adsorption or occlusion. During the rapid drying step, the silver compounds in the absorbed liquids are reduced by the action of the reducing agent, the presence of which during the drying step is essential to the catalyst-producing process of the invention. As a direct result of this reduction during the course of the rapid drying step, a thin film of metallic silver possessing improved characteristics is deposited upon the surface of the support.

Critical to the process of the invention is the simultaneous rapid drying of the impregnated support and deposition of metallic silver in one and the same step. Moreover, it is essential that this step be carried out within a well-defined very short period of time. It is this critical combination of conditions which enables the formation of the catalyst wherein the silver surface presents a very fine and even layer which is uniformly deposited upon the entire surface of the supports. The improved catalytic activity, particularly with respect to the catalytic oxidation of olefins to olefin oxides, are directly attributable to characteristics peculiar to the homogeneously distributed very fine silver particles obtained in the catalyst by the above-defined method. The catalyst so produced has proven to be not only markedly more efficient in the oxidation of olefins to olefin oxides, being capable of retaining high activities and excellent selectivities over long periods of use, but now enables the vapor phase oxidation of olefins such as propylene to the corresponding epoxide with substantial yield.

Without intent to limit the scope of the invenion by theoretical explanation, it is believed that the excellent uniformity of the silver surface of these catalysts, the extremely fine size of the particles forming this surface, and the characteristics peculiar thereto, are obtained because the very rapid removal of liquid constituents comprised in the impregnating solution, combined with a highly efficient conversion under these conditions of the silver compounds in these solutions, prevents migration of silver from the inner to the outer pores of the support during the drying step, so that the silver is evenly deposited within the surface of all pores.

In addition, it is noted that the process of the invention, apart from yielding improved catalysts, is also very attractive because it is so simple and practical.

Suitable reducing agents comprise, for example, hydrazine, hydroxylamine, and preferably organic reducing agents such as ethanolamine, methanol, isopropylalcohol, acetone, formaldehyde, acetalhyde, formic acid, and the like. Preferred organic reducing agents comprise the polyhydric alcohols, such as the glycols, for example, propylene glycol, butylene glycol, polyvinyl alcohol, polyethylene glycol, polypropylene glycol, glycerol, glucose, sucrose and the like. The reducing agent is generally added to the support as a component of the impregnating solution of silver compounds used to impregnate the supports. The impregnating solution may comprise the reducing agent as such as vehicle for a silver compound reducible under the defined drying conditions. In general, the impregnating solution will comprise in addition to the reducing agent, a solvent in which the silver compound possesses appreciable solubility and which is substantially inert under the conditions of the rapid drying-reducing step. Water is a suitable inert solvent, and aqueous impregnating solutions are preferably employed. In particular, when polyhydric alcohols are employed as reducing agents, the incorporation thereof in aqueous impregnation solutions is very beneficial, since these surfactants, for example, ethylene glycol, significantly facilitate the homogeneous penetration of the solutions into the smallest pores of the supports. The weight ratio of reducing agent to water in the aqueous suitable impregnating solutions may vary within wide limits, provided the amount of reducing agent is balanced with the amount of silver compound in the solution in order to give appropriate deposition of silver during the drying treatment. Ratios between 20:80 and 80:20 are recommended in particular.

After the impregnation but before the impregnated support is subjected to the rapid drying step, the excess of impregnation liquid is removed by suitable means which may comprise one or more steps such as decantation, centrifugation, filtration or similar procedure. A certain degree of predrying of the impregnated support may be tolerated provided, however, that such predrying does not remove any substantial amount of reducing agent absorbed in the pores of the carrier.

The rapid drying step involving simultaneous reduction of the silver compound is carried out at conditions of very high evaporating efficiency which enable the reducing agent to form the characteristic deposit of metallic silver from the impregnating solution. Suitable high evaporating and reducing efficiency is obtained with a wide range of possible conditions. Specific conditions, comprising, for example, temperatures and pressures preferably employed in the rapid-drying step will be governed to some extent by the specific components employed in the impregnating solution.

In the rapid-drying step, conditions are controlled to effect the evaporation of at least about 80% by volume of absorbed liquid from the impregnated support in at most about 900 seconds. Generally more rapid evaporation of the absorbed liquid produces more active catalysts. The rapid drying is preferably controlled to remove at least about 90% v. of absorbed liquid from the impregnated support within a time period of at most about 300 seconds. Under the particularly preferred rapid drying conditions, substantially complete drying is achieved in a period ranging from about 0.5 to about 120 seconds. The rapid drying may be effected by bringing the impregnated support into intimate contact with a heated gaseous atmosphere. Drying by direct contact with a hot gaseous medium may be combined with the use of subatmospheric pressures to increase the evaporating-silver depositing efficiency. Any relatively inert gaseous atmosphere may be applied, for example, pure oxygen, nitrogen, argon, helium, hydrogen, carbon dioxide, or mixtures thereof. For reasons of economy, the use of preheated air is generally preferred. When an oxygen-containing atmosphere is employed in the rapid-drying treatment, at least a part of the metallic silver precipitated on the surface of the support may be converted to silver oxide during the drying. The resulting catalysts wherein the silver is partly present as silver oxide are also included within the scope of this invention. The silver metal in a catalyst produced by the rapid-drying step carried out under non-oxidizing conditions may be converted at least in part to silver oxide form by heat-treating in an oxygen-containing atmosphere which may comprise, for example, oxygen or air. Rapid drying temperature conditions comprise temperatures above about 250° C., preferably between about 300 and about 550° C. These temperatures refer to the temperature of the impregnated support during the rapid drying. Temperatures of the gaseous heating media are generally higher, for example 700 or even 1000° C. Temperature conditions within the zone wherein the rapid-drying step is executed therefore range from about 250 to about 1000° C. The supports can be selected at will from the large number of conventional catalyst carriers or support materials. Such conventional support materials may be of natural or synthetic origin and of microporous and/or macroporous structure. They may have the shape of fine particles, chunks, pieces, pellets, rings, spheres and the like. The suitable supports comprise those of siliceous and/or aluminous compositions. Specific examples of suitable supports are the aluminum oxides, including the material sold under the trade name "Alundum," charcoal, pumice, magnesia, kieselguhr, fuller's earth, silicon carbide, porous aggregates comprising silicon and/or silicon carbide, fused alumina, selected clays, artificial and natural zeolites, metal oxide gel-type materials comprising oxides of heavy metals such as chromium, molybdenum, tungsten and the like, ceramics, etc. Suitable porous aggregates comprise those conventionally obtained by bonding together granules or composites of one or more of the foregoing materials. The support material particularly preferred will be governed to some extent by the use to which the finished catalyst is put. Supports particularly useful in the preparing of catalysts destined for use in olefin oxidation processes comprise the aluminuous materials, in particular alpha-alumina. In the case of aluminum oxide supports, preference is given to those having a pore volume between about 15 and about 30 ml./g. and surface area below about 10 m.$^2$/g., more preferably less than about 1 m.$^2$/g. The carriers may be in the form of a powder having, for example, particle sizes and size distributions which are conventional for fluid-bed application, and also in the form of other small particles, such as pellets, rings or spheres having diameters above about .08 mm.

The activity and the selectivity of the catalysts prepared in accordance with the invention may further be increased by the inclusion of one or more compounds of alkaline earth or alkali metals, preferably lithium compounds, as promoters. Although such promoters may be added to the supports after the silver surface has been applied thereto, the attractive effects obtainable with these promoting compounds are more strongly pronounced when they are added to the supports before the latter are impregnated with the solutions of silver compounds. Particularly suitable promoters are the metal oxides and compounds which can thermally be decomposed or be converted into an oxide by heat-treatment with oxygen or oxygen-containing gas. Examples of the latter group of compounds are hydroxides, carbonates, nitrates, the carboxylates such as acetates, propionate, lactates, oxalates, etc. The addition of promoters to the catalysts or to the supports may be effected by any suitable method, impregnation with aqueous solutions giving excellent results. When heat treatment is applied to effect thermal and/or chemical conversion of the said metal compounds into metal oxides, it is especially recommended to heat the particles of the porous supports to temperatures between about 350 and about 650° C., more preferably between about 400 and about 550° C. At the latter preferred temperatures the promoters aret stongly bonded to the suface of the supports.

The amounts of the promoting compounds in the final catalyst are as a rule only very small, preferred amounts lying between about 0.03 and about 0.5% w., calculated as metal on the weight of the support.

The present novel, silver catalysts have been shown to be particularly useful catalysts for the direct oxidation of olefins with molecular oxygen to olefin oxides, more in particular for the oxidation of ethylene to ethylene oxide. The conditions for carrying out such oxidation reactions in the presence of the silver catalysts of the present invention comprise broadly those described in the prior art. This applies, for example, to suitable temperatures, pressures, residence times, diluent materials, such as nitrogen, carbon dioxide, steam, argon, methane or other saturated hydrocarbons, presence or absence of moderating agents to control the catalytic action, for example, 1,2-dichloroethane or chlorinated polyphenyl compounds, the desirability to employ recycle operations or to apply successive conversions in different reactors to increase the yields of the products envisaged, and any other special conditions which may be selected in the processes for preparing ethylene oxide, propylene oxide or other olefin oxides from the corresponding olefinic hydrocarbons. For example, the controlled oxidation with an oxygen-containing gas of monoolefinic hydrocarbons such as ethylene and propylene, to the corresponding oxides with the aid of the novel silver catalysts of the invention may be carried out at temperatures in the range of, for example, from about 150 to about 450° C., and preferably in the range of from about 200 to about 300° C. Pressures in the range of from about atmospheric to about 500 p.s.i. are generally employed. Higher pressures may, however, be employed within the scope of the invention. Molecular oxygen employed as reactant is obtained from any suitable source. The suitable oxygen charge may consist essentially of relatively pure oxygen, a concentrated oxygen stream comprising oxygen in major amount with lesser amounts of one or more diluents such as nitrogen, argon, etc. The use of more dilute oxygen streams, including air, as the oxygen reactant source is comprised within the scope of the invention.

It will therefore be clear that the use of the present novel silver catalysts in olefin oxidation reactions is in no way limited to the use of any specific conditions among those which are effective. In the said oxidation reactions the catalysts of this invention are preferably used in fixed beds although the application of fluidized catalyst beds is not excluded.

EXAMPLE I

Preparation of catalysts

Experiments were carried out wherein catalysts prepared in accordance with the present invention, catalysts I–1 and I–2, were compared with catalysts prepared by methods used heretofore, Catalysts I–X and I–Y.

In all of the following examples the catalyst support used was a particulate α-alumina with a surface area of less than 1 m.²/g., a pore volume of 0.23 ml./g., and a particle size between 0.074 and 0.300 mm. This support was previously dried by calcination in an oven at a temperature of 500° C. for 2 hours; the dried support contained less than 0.1% w. of water.

Catalyst I–1.—The support was impregnated with a solution of silver nitrate in a mixture of water and ethylene glycol containing 50% v. of water, the quantity of impregnating liquid used being only sufficient to just completely fill the pores of the support with liquid. Thereafter the impregnated support was heated on a steam bath at 100° C. with stirring until the impregnated particulate support acquired the nature of a free-flowing powder. At this stage the support contained 16.8% w. of liquid absorbed within the pores. The impregnated support particles were then subjected to the rapid-drying treatment by dropping them down through a vertically position glass tube, at a rate of 25 g./h. countercurrent to a stream of oxygen preheated to a temperature of 500° C., and flowing upwardly through the tube at the rate of 5 l./h. The tube was 40 cm. long with an internal diameter of 1 cm. The average residence time of the impregnated support particles in the tube was about 3.5 seconds. The catalyst particles discharged from the tube contained less than 0.1% w. of liquid constituents, determined at room temperature.

Catalyst I–2.—This catalyst was prepared under substantially identical conditions used in the preparation of the preceding catalyst I–1 with the exception that air was used instead of oxygen in the rapid drying step. The catalyst discharged from the tubular rapid drying zone again had a liquid content of less than 0.1% w.

Catalyst I–X.—In preparing this catalyst the identical conditions used in the preparation of foregoing catalyst I–1 were used up to and including the predrying on the steam bath. Thereafter the predried impregnated support was heated in an oven to 300° C. in one hour and then kept at that temperature for another two hours. After cooling to room temperature the catalyst contained less than 0.1% w. of liquid.

Catalyst I–Y.—The support defined above was impregnated with a solution of silver nitrate in water and then predried on a steam bath as described in the preparation of catalyst I–1. Thereafter the impregnated support was dried completely, while the silver compound, precipitated upon the surface of the support, was simultaneously reduced to metallic silver by passing a mixture of 10% w. of hydrogen and 90% w. of nitrogen over the support at a temperature of 280° C. for 2½ hours. After cooling, the resulting catalyst was found to have a liquid content below 0.1% w. After cooling the catalyst was ready; its liquid content was below 0.1% w.

In the preparation of the catalysts I–1, I–2, I–X and I–Y, the amounts of silver compound added to the support were controlled in all cases to give the same silver content of 10.8% w. in all of the catalysts, calculated as metal on the weight of the support.

Activity of catalysts

Catalyst I–1, I–2, I–X and I–Y, prepared as described above, were tested under comparable conditions in the oxidation of ethylene to ethylene oxide with molecular oxygen, using a fluidized bed reactor. In each test run, 30 g. of the catalyst was mixed with 30 g. of untreated support particles and introduced into a glass tubular reactor having a length of 50 cm. and an internal diameter of 2.5 cm. At a pressure of 1.08 atma., a gaseous mixture of ethylene and air, having a molar ratio of ethylene to air of 1:19, was passed upwardly through the catalyst bed at a space velocity (GHSV) of 1866 l./kg. catalyst/hour. The temperature of the fluidized bed was now raised to 400° C. and maintained at this value during one hour. Thereafter the temperature was lowered to 260° C. and at this temperature the activity and selectivity of the catalysts were determined and expressed in terms of ethylene conversion and ethylene oxide selectivity. Conversion is calculated as a percentage from the equation $c = 100(1-X)$, wherein $X$ is the ratio of the molar amount of ethylene in the product gas to the molar amount of ethylene in the feed gas. Selectivity is calculated as a percentage from the equation $s = 100xY$, wherein $Y$ is the molar ratio of the amount of ethylene oxide formed to the amount of ethylene converted. The experimental results given in Table I, and in the tables of the subsequent examples have been determined independently per pass; no unconverted ethylene having been recycled to the reactor in the test runs. Following Table I gives the results found for the catalysts I–1, I–2, I–X and I–Y prepared as described in the foregoing Example I.

TABLE I

| | Performance | |
|---|---|---|
| | Conversion, percent | Selectivity, percent |
| Catalyst: | | |
| I–1 | 42.5 | 45.3 |
| I–2 | 40.9 | 39.8 |
| I–X | 23.5 | 38.5 |
| I–Y | 26.4 | 30.6 |

These results demonstrate the superiority of the catalysts I–1 and I–2, prepared in accordance with the invention, in combining a high activity with a high selectivity, as compared to catalysts I–X and I–Y prepared by methods used heretofore.

EXAMPLE II

Effect of silver content

Three catalysts, II–1, II–2 and II–3, were prepared as described hereinabove in the preparation of catalyst I–1 of foregoing Example I with the exception that in the impregnation solutions used, the amount of silver nitrate was varied to give silver contents in the final catalysts of 10.8, 16.2 and 21.6, respectively, calculated as metal on support, and the temperature of the stream of drying gas in rapid-drying step was 540° C. All other conditions remained unchanged. The catalysts were tested as described above in Example I.

TABLE II

| | | Performance | |
|---|---|---|---|
| | Ag content, percent w. | Conversion, percent | Selectivity, percent |
| Catalyst: | | | |
| II–1 | 10.8 | 42.3 | 45.2 |
| II–2 | 16.2 | 46.8 | 46.4 |
| II–3 | 21.6 | 52.5 | 47.4 |

EXAMPLE III

Effect of promoting compounds

A catalyst, III–0, containing 21.6% w. of silver was prepared under the conditions described in the preparation of the catalyst II–3 of the foregoing Example II. The activity of this catalyst was compared with that of catalysts III–1, III–2, III–3 and III–4, in which a promoting amount of a lithium compound had been incorporated. The promoted catalysts were prepared as follows:

Catalyst III–1.—The support was impregnated with a solution of silver nitrate in a water/ethylene glycol mixture containing 50% v. of water. Before the impregnation with the silver compound-containing solution, the support was impregnated with an aqueous solution of lithium hydroxide and dried at a temperature of 200° C. for two hours. Thereafter the procedure described in Example II was followed.

Catalyst III–2.—In preparing this catalyst, the procedure described in preparing the foregoing catalyst III–1 was followed, but with the exception that lithium nitrate was used instead of lithium hydroxide; all other conditions remaining unchanged.

Catalyst III–3.—In the preparation of this catalyst the lithium compound and the silver compound were added simultaneously by impregnating the support with a solution of both silver nitrate and lithium nitrate in a mixture of water and ethylene glycol containing 50% v. of water, and thereafter following the procedure used in the preparation of catalyst II–3 of Example II.

Catalyst III–4.—This catalyst was prepared by impregnating catalyst II–3, containing 21.6% w. silver described in foregoing Example II, with a solution of lithium hydroxide in water and drying the impregnated catalyst thus obtained by heating in air at a temperature of 200° C. for two hours.

The amounts of lithium compounds and silver compounds used to prepare these lithium-promoted catalysts were controlled so that each promoted catalyst produced contained 0.14% w. of lithium, calculated as metal on support, and 21.6% w. of silver, calculated as metal on support.

The catalysts were then subjected to the testing method described in foregoing Example I.

TABLE III

| | Preparation of catalysts, order of addition | | Performance | |
|---|---|---|---|---|
| | 1 | 2 | Conversion, Percent | Selectivity, Percent |
| Catalyst: | | | | |
| III–0 | Ag | None | 52.5 | 47.4 |
| III–1 | Li | Ag | 44.5 | 59.6 |
| III–2 | Li[1] | Ag | 40.1 | 58.0 |
| III–3 | Ag+Li[1] | None | 35.5 | 53.8 |
| III–4 | Ag | Li | 33.3 | 41.7 |

[1] Added as nitrate.

The results of this table illustrate the advantage inherent in adding the promoter to the support before the silver compound.

EXAMPLE IV

Heat-treatment of promoters

Catalysts, IV Series, were prepared by the method wherein the lithium hydroxide was added to the support before impregnation with silver nitrate solution as described in preparing catalyst III–1 of the foregoing Example III. The procedure followed here differed from that given in the foregoing Example III in that different amounts of silver nitrate were used. The catalysts of the IV series here prepared contained 0.14% w. lithium and 10.8% w. silver, calculated on the weight of the support. Furthermore, between the impregnation with lithium hydroxide and the addition of silver nitrate, the supports were heated, in air, at temperatures between 400 and 900° C. for periods of two hours in each case. The remaining conditions were all identical to those given in the relevant experiment of Example III.

To test the performance of the catalysts thus obtained, 40 g. of catalyst was mixed with 40 g. of untreated support and introduced into the reactor described in Example I. Apart from the space velocity, now being 1400 l./kg. catalyst/hour, all other conditions were identical to those given for the tests runs of Example I.

TABLE IV

| | Performance | |
|---|---|---|
| Preparation of catalysts, IV series | Conversion, Percent | Selectivity, Percent |
| Promoter activated at, ° C.: | | |
| 400 | 49.3 | 70.2 |
| 500 | 46.1 | 75.2 |
| 550 | 48.2 | 61.8 |
| 600 | 54.5 | 59.3 |
| 900 | 60.4 | 40.7 |

EXAMPLE V

Fixed-bed experiments

For the purpose of comparison, four different catalysts, A, B, C and D, were prepared strating from an alpha-alumina support having a surface area of less than 1 m.²/g., a pore volume of 0.2 ml./g., and a particle size between 0.6 and 1.6 mm. This support contained less than 0.1% w. of water.

The first catalyst, A, was prepared by impregnating the support with an aqueous solution of lithium hydroxide, drying and heating the impregnated support in air at a temperature of 450° C. for two hours, and subsequently impregnating the support with a solution of silver nitrate in an ethylene glycol/water mixture containing 75% v. of water. The impregnated support was predried over a steam bath to a liquid content of 7.8% w. and then subjected to the rapid-drying step, applying air with a temperature of 900° C. as the drying atmosphere; the other conditions of the rapid-drying step being identical to those described in the preparation of Catalyst I–2 in foregoing Experiment I. After the shock-drying the catalyst was ready; it contained 0.14% w. lithium, 10.8% w. silver, calculated as metals on support, and less than 0.1% w. liquid constituents.

To prepare catalyst B, the procedure used in preparing catalyst A was repeated at substantially identical conditions with the exception that a nitrogen atmosphere was used in the rapid-drying step. Before testing, catalyst B was heated in air at 500° C. for six hours. The final catalyst contained 10.8% w. silver and 0.15% w. lithium, calculated as metal on support.

Catalyst C was obtained by repeating the procedure given for the preparation of catalyst A but omitting the addition of lithium hydroxide.

Catalyst D was produced by impregnating the support with an aqueous solution of silver nitrate and predrying the wet support over a steam bath. Thereafter, the procedure used in preparing catalyst I–Y given in foregoing Example I was repeated. Catalysts C and D each contained 10.8% w. of silver, calculated as metal on support.

The activities and selectivities of catalysts A, B, C and D were now determined by comparatively oxidizing ethylene to ethylene oxide in a fixed catalyst bed at a pressure of 1.08 atma., a contact time of 8.4 seconds, and temperatures between 230 and 288° C., in a reactor consisting of a glass tube having an internal diameter of 15 mm. and a length of 85 cm. This reactor was immersed in an externally heated fluidized bed of powdered silica-alumina particles acting as heat-transfer medium. In each run 100 g. of catalyst were placed in the reactor, giving a catalyst bed length of 60 cm. The gaseous mixtures brought into contact with the catalysts comprised 25% m. ethylene, 8.7% m. oxygen and 66.3% m. nitrogen, or 3% m. ethylene and 97% m. air, respectively. Each of these mixtures contained 3×10⁻⁶% m., based on the molar amount of ethylene, of the chlorinated polyphenyl compound "Aroclor" 4465 as moderator (Aroclor is a trademark).

In each run an initial period of 400 hours' operation at a constant temperature of 280° C. and space velocity of 340 l./kg. catalyst/hour preceded the actual test run, which was effected at the conditions given hereinbefore. In these runs the temperatures were varied in order to find comparative conversion percentages; the experiments were carried out without recycling unconverted ethylene.

The results obtained with catalysts A, B, C and D in these runs are given in the following Table V and in the graphs of FIGS. I and II of the attached drawings, wherein the horizontal axes represent ethylene conversion in mole percent and the vertical axes represent selectivity to ethylene oxide in mole percent. In the graphs, the lines A, B, C and D represent results of the runs executed in the presence of the catalysts A, B, C and D, respectively. From the graphs it is seen that the conversion/selectivity values for the runs using catalysts prepared in accordance with the invention (A, B, C) are superior to those for the run using Catalyst D. Catalyst A, furthermore, retained a constant high level of catalytic activity over a prolonged period of operation of more than 3800 hours, indicating conclusively the excellent stability of this catalyst. The runs with catalysts B and C were continued for more than 580 hours and more than 1200 hours, respectively. In these prolonged runs, too, no decrease in catalytic activity and selectivity could be observed.

TABLE V

| Feed, molar ratio, $C_2H_4:O_2:N_2$ | Conditions Temperature, °C. | | | | Performance Conversion, percent m | Selectivity, percent m | | | | $C_2H_4$:air | Conditions Temperature, °C. | | | | Performance Conversion, percent m | Selectivity, percent m | | | |
|---|---|---|---|---|---|---|---|---|---|---|---|---|---|---|---|---|---|---|---|
| | A | B | C | D¹ | | A | B | C | D¹ | | A | B | C | D¹ | | A | B | C | D¹ |
| 25.0:8.7:66.3 | 262 | 247 | 255 | 236 | 9.6 | 78.7 | 79.3 | 75.9 | 69.2 | 3:97 | 249 | | 256 | 258 | 43.8 | 82.9 | | 76.1 | 70.4 |
| 25.0:8.7:66.3 | 270 | 253 | 262 | 255 | 12.3 | 76.9 | 77.5 | 74.2 | 68.3 | 3:97 | 260 | | 265 | 276 | 60.6 | 80.3 | | 72.7 | 68.2 |
| 25.0:8.7:66.3 | 280 | 264 | 272 | 278 | 16.4 | 75.2 | 75.4 | 71.0 | 65.8 | 3:97 | | | | 288 | 67.0 | | | | 66.5 |
| 25.0:8.7:66.3 | 287 | 276 | | | 19.8 | 73.7 | 72.9 | | | 3:97 | 278 | | 279 | | 88.3 | 73.5 | | 67.2 | |

¹ For comparison, not according to this invention.

EXAMPLE VI

Oxidation of propylene

Propylene oxide was prepared by oxidation of propylene with molecular oxygen in the presence of catalyst A, prepared as described in the preceding Example V. The oxidation was carried out at temperatures of 240° C. and 328° C., respectively, a pressure of 1.08 atma., a contact time of 9 seconds and a space velocity (GHSV) of 300 l./kg. catalyst/hour. The gaseous mixture which was contacted with the catalyst comprised 25% m. of propylene, 10% m. of oxygen and 65% m. of nitrogen. The initial reaction period was omitted; the remaining conditions were the same as described in Example V.

A selectivity to propylene oxide of 55% m. was obtained with a conversion of propylene of 2% m. at 240° C. at 328° C. selectivity to propylene oxide was 20% m. with a conversion of 5% m.

I claim as my invention:

1. The process for the preparation of a supported silver catalyst particularly suitable for the controlled oxidation of ethylene to ethylene oxide comprising the consecutive steps of (a) impregnating a porous alpha-alumina catalyst support with an aqueous solution of silver nitrate and ethylene glycol reducing agent, (b) separating the resulting impregnated support containing at least a substantial part of said solution in absorbed state from the portion of said solution remaining unabsorbed, and (c) thereafter reducing the silver nitrate to silver metal and simultaneously removing at least about 80% by volume of absorbed liquid from said impregnated support comprising said ethylene glycol-containing solution during a time period of not more than 300 seconds in a drying zone wherein the impregnated support is maintained at a temperature in the range of from about 300 to about 550° C.

2. The process in accordance with claim 1 wherein substantially all of the absorbed liquid is removed from said impregnated support during a time period of from 0.5 to 120 seconds.

3. The process in accordance with claim 2 wherein substantially all of the absorbed liquid is removed from said impregnated support during a time period of 3.5 seconds.

References Cited

UNITED STATES PATENTS

| 2,920,052 | 1/1960 | Martin | 252—463 |
| 2,901,441 | 8/1959 | Waterman | 252—463 |
| 2,426,761 | 9/1947 | Cambron | 252—258 |
| 2,458,266 | 1/1949 | Heider | 260—348.5 |
| 3,144,416 | 8/1964 | Hosada | 252—476 |
| 2,825,701 | 3/1958 | Endler | 252—475 |

FOREIGN PATENTS

| 522,234 | 6/1940 | England | 252—463X |

DANIEL E. WYMAN, Primary Examiner

P. M. FRENCH, Assistant Examiner